(12) United States Patent
Yum et al.

(10) Patent No.: US 10,009,917 B2
(45) Date of Patent: Jun. 26, 2018

(54) METHOD FOR MULTI-SUBFRAME SCHEDULING AND APPARATUS FOR THE SAME

(71) Applicant: LG ELECTRONICS INC., Seoul (KR)

(72) Inventors: Kunil Yum, Seoul (KR); Suckchel Yang, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 14/836,325

(22) Filed: Aug. 26, 2015

(65) Prior Publication Data
US 2016/0065332 A1    Mar. 3, 2016

Related U.S. Application Data

(60) Provisional application No. 62/042,256, filed on Aug. 27, 2014, provisional application No. 62/048,806, filed on Sep. 11, 2014.

(51) Int. Cl.
| | |
|---|---|
| *H04W 40/00* | (2009.01) |
| *H04W 74/04* | (2009.01) |
| *H04W 72/12* | (2009.01) |
| *H04L 1/18* | (2006.01) |
| *H04L 1/00* | (2006.01) |
| *H04L 1/16* | (2006.01) |

(52) U.S. Cl.
CPC ....... *H04W 72/1268* (2013.01); *H04L 1/1887* (2013.01); *H04L 1/1896* (2013.01); *H04W 72/1263* (2013.01); *H04L 1/0031* (2013.01); *H04L 1/1671* (2013.01); *H04W 72/1289* (2013.01)

(58) Field of Classification Search
None
See application file for complete search history.

(56) References Cited

U.S. PATENT DOCUMENTS

| | | | | |
|---|---|---|---|---|
| 2011/0122825 A1* | 5/2011 | Lee | ...................... | H04J 11/0069 370/328 |
| 2011/0249601 A1* | 10/2011 | Seo | ........................ | H04L 1/0003 370/310 |
| 2012/0127938 A1* | 5/2012 | Lv | ..................... | H04W 72/1205 370/329 |
| 2015/0264708 A1* | 9/2015 | Li | ......................... | H04W 28/06 370/329 |

* cited by examiner

*Primary Examiner* — Edan Orgad
*Assistant Examiner* — Sithu Ko
(74) *Attorney, Agent, or Firm* — Dentons US LLP

(57) ABSTRACT

A method for multiple subframe sets scheduling (hereinafter, multi-subframe scheduling) in a window of the multi-subframe scheduling (hereinafter, multi-subframe scheduling window) performed by a terminal is provided. The method includes receiving multi-subframe control information for the multi-subframe scheduling, and receiving downlink data or transmitting uplink data using the multi-subframe control information, wherein the multi-subframe control information includes a field for retransmission related to each subframe of the multiple subframe sets, and the retransmission is performed in a subframe not configured as the multiple subframe sets.

14 Claims, 8 Drawing Sheets

METHOD FOR MULTI-SUBFRAME SCHEDULING AND APPARATUS FOR THE SAME

Pursuant to 35 U.S.C. § 119(e), this application claims the benefit of U.S. Provisional Application Nos. 62/042,256, filed on Aug. 27, 2014 and 62/048,806, filed on Sep. 11, 2014, which are hereby incorporated by reference as if fully set forth herein.

BACKGROUND OF THE INVENTION

Field of the Invention

The present invention relates to a wireless communication system and, more particularly, to a method for multi-subframe scheduling and an apparatus for the same.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

The present invention proposes a scheduling scheme for a multi-subframe group, and proposes a more efficient UE scheduling scheme through the scheduling scheme.

Technical problems to be solved by the present invention are not limited to the above-mentioned technical problems, and other technical problems not mentioned herein may be clearly understood by those skilled in the art from description below.

To achieve these objects and other advantages and in accordance with the purpose of the invention, as embodied and broadly described herein, a method for multiple subframe sets scheduling (hereinafter, multi-subframe scheduling) in a window for the multi-subframe scheduling (hereinafter, multi-subframe scheduling window) performed by a terminal includes receiving multi-subframe control information for the multi-subframe scheduling, and receiving downlink data or transmitting uplink data using the multi-subframe control information, wherein the multi-subframe control information includes a field for retransmission related to each subframe of the multiple subframe sets, and the retransmission is performed in a subframe not configured as the multiple subframe sets.

Additionally or alternatively, the multi-subframe control information may include a multi-subframe scheduling hybrid automatic repeat request (HARQ) process number field allocated to the multi-subframe scheduling window, and a HARQ process number of each subframe of the multiple subframe sets may be acquired from a value of the multi-subframe scheduling HARQ process number field.

Additionally or alternatively, the multi-subframe control information may include a multi-subframe scheduling HARQ process number field allocated to the multi-subframe scheduling window, and a HARQ process number of each subframe of the multiple subframe sets may be acquired from a combination of a value of the multi-subframe scheduling HARQ process number field, and a value of a modulation and coding scheme (MCS) field and/or a redundancy version (RV) field.

Additionally or alternatively, the multi-subframe control information may include full multi-subframe control information for one subframe set of the multiple subframe sets and partial multi-subframe control information for remaining subframe sets of the multiple subframe sets.

Additionally or alternatively, remaining control information which is not included in the partial multi-subframe control information may be acquired from particular control information of the full multi-subframe control information.

Additionally or alternatively, the partial multi-subframe control information may include an offset value for a particular field of the full multi-subframe control information.

Additionally or alternatively, the method may further include receiving information about the one subframe set and the remaining subframe sets.

Additionally or alternatively, the multi-subframe control information may include information about a size of the multi-subframe scheduling window and each subframe set configuration of the multiple subframe sets.

In another aspect of the present invention, a terminal for multiple subframe sets scheduling (hereinafter, multi-subframe scheduling) in a window for the multi-subframe scheduling (hereinafter, multi-subframe scheduling window) includes a radio frequency (RF) unit, and a processor configured to control the RF unit, wherein the processor is configured to receive multi-subframe control information for the multi-subframe scheduling, and receive downlink data or transmit uplink data using the multi-subframe control information, wherein the multi-subframe control information includes a field for retransmission related to each subframe of the multiple subframe sets, and the retransmission is performed in a subframe not configured as the multiple subframe sets.

Additionally or alternatively, the multi-subframe control information may include a multi-subframe scheduling HARQ process number field allocated to the multi-subframe scheduling window, and a HARQ process number of each subframe of the multiple subframe sets may be acquired from a value of the multi-subframe scheduling HARQ process number field.

Additionally or alternatively, the multi-subframe control information may include a multi-subframe scheduling HARQ process number field allocated to the multi-subframe scheduling window, and a HARQ process number of each subframe of the multiple subframe sets may be acquired from a combination of a value of the multi-subframe scheduling HARQ process number field, and a value of an MCS field and/or an RV field.

Additionally or alternatively, the multi-subframe control information may include full multi-subframe control information for one subframe set of the multiple subframe sets and partial multi-subframe control information for remaining subframe sets of the multiple subframe sets.

Additionally or alternatively, remaining control information which is not included in the partial multi-subframe control information may be acquired from particular control information of the full multi-subframe control information.

Additionally or alternatively, the partial multi-subframe control information may include an offset value for a particular field of the full multi-subframe control information.

Additionally or alternatively, the processor may be configured to receive information about the one subframe set and the remaining subframe sets.

Additionally or alternatively, the multi-subframe control information may include information about a size of the multi-subframe scheduling window and each subframe set configuration of the multiple subframe sets.

It should be noted that the above-mentioned technical solutions are merely a part of embodiments of the present invention, and various embodiments reflecting technical characteristics of the present invention may be derived and understood by those skilled in the art from detailed description of the present invention given below.

BRIEF DESCRIPTION OF THE DRAWINGS

The accompanying drawings in the present specification are intended to provide better understanding of the present invention, illustrate various embodiments of the present invention, and describe a principle of the present invention together with a description in the specification.

DETAILED DESCRIPTION OF THE INVENTION

Figure 1:
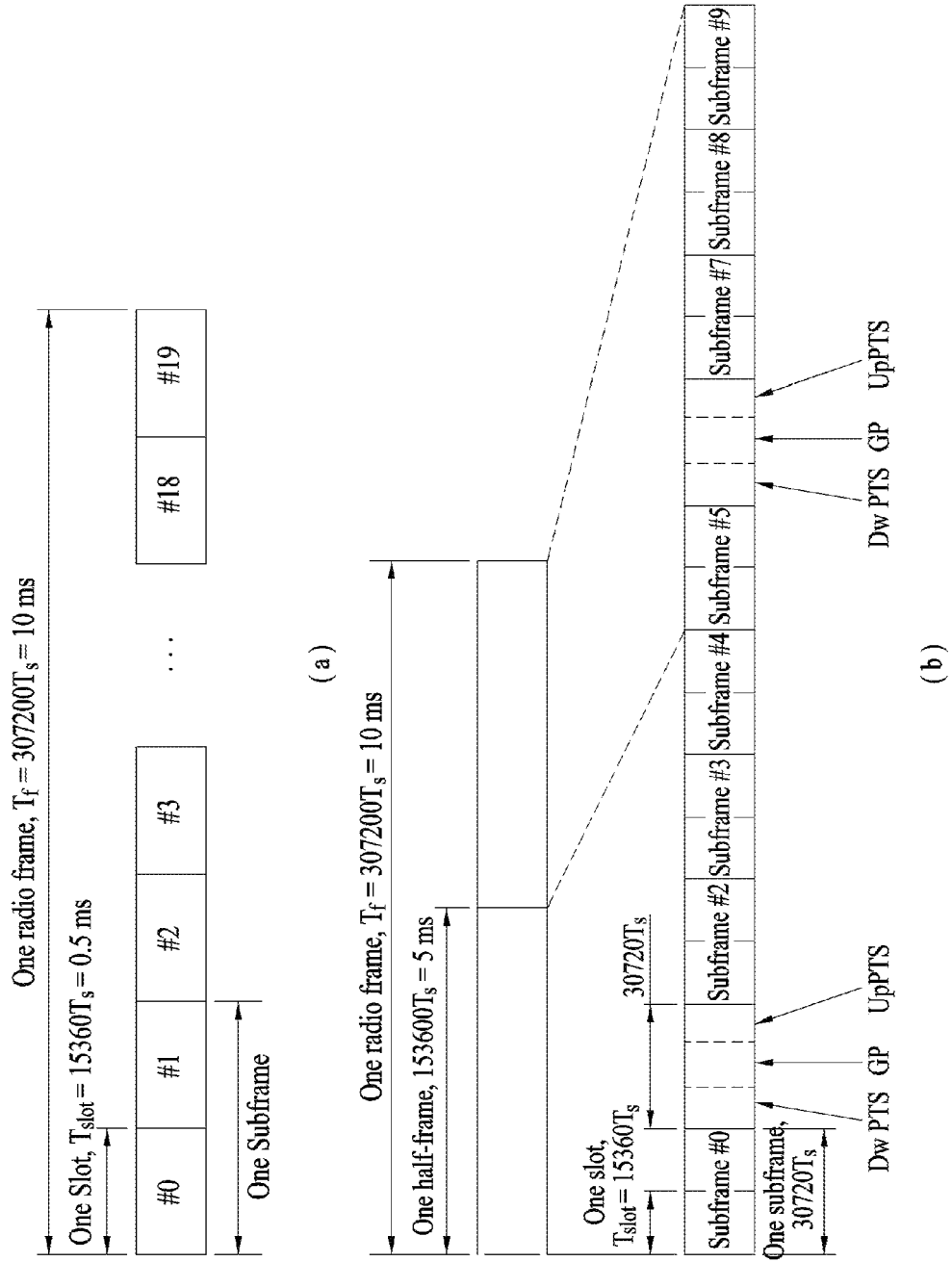
FIG. 1 is a diagram illustrating an example of a configuration of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
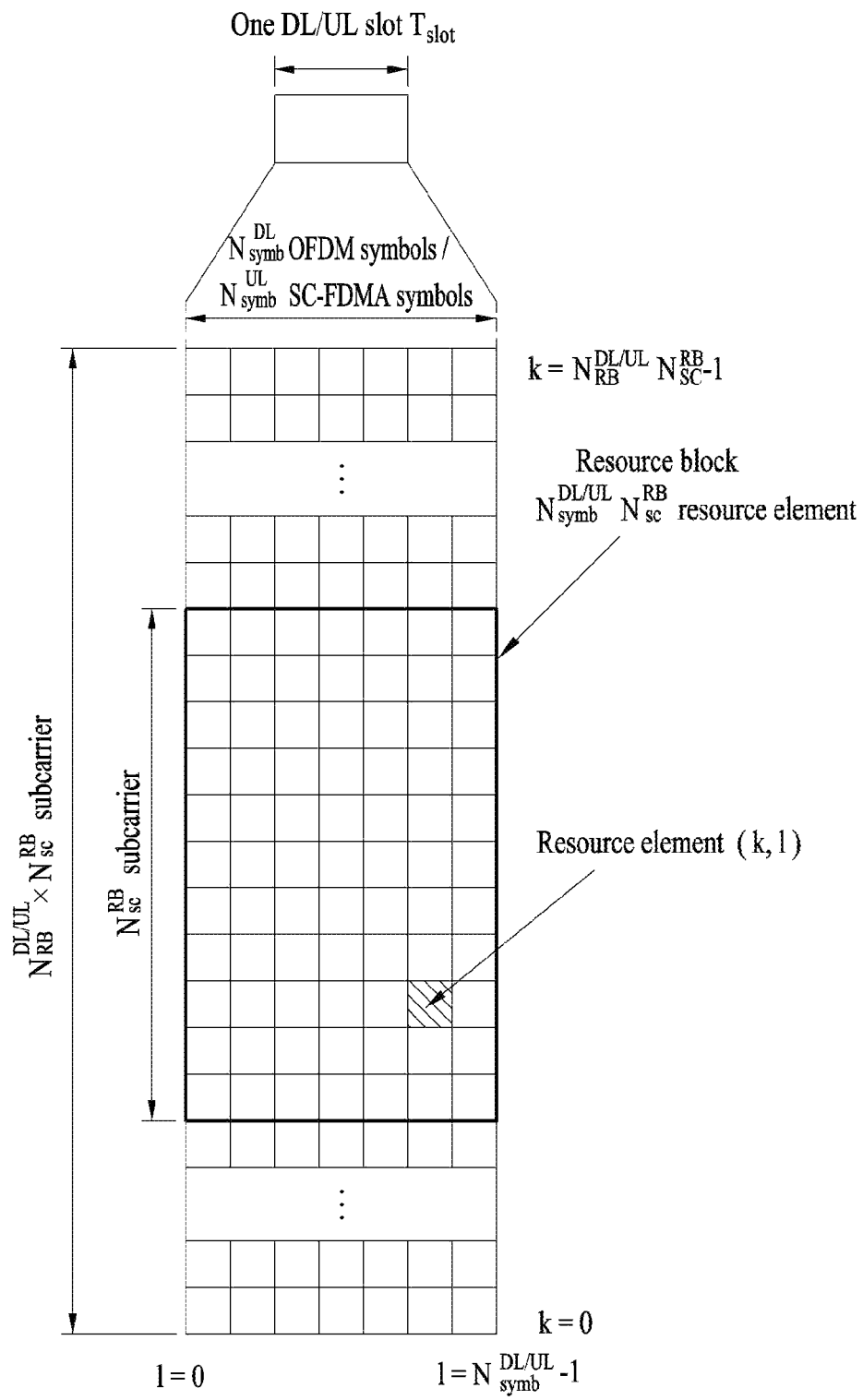
FIG. 2 is a diagram illustrating an example of a configuration of a downlink/uplink (DL/UL) slot in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
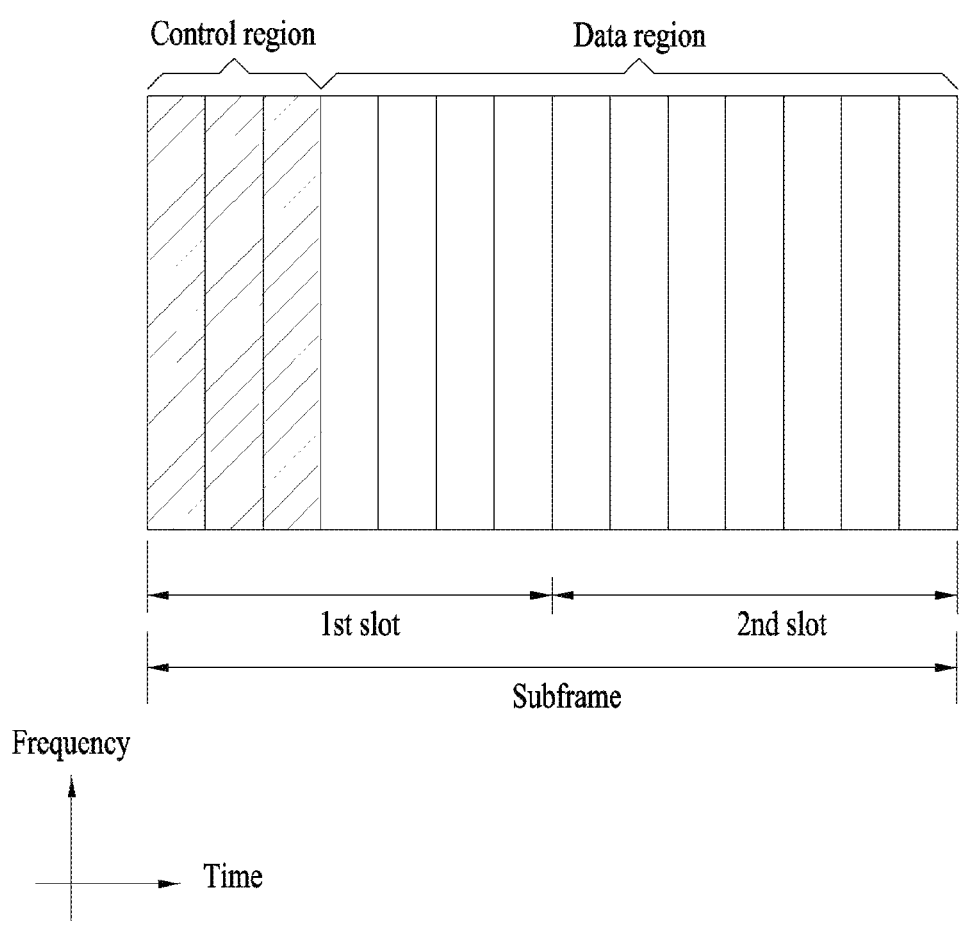
FIG. 3 is a diagram illustrating an example of a configuration of a DL subframe used in a 3rd generation partnership project (3GPP) long term evolution (LTE)/LTE-advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
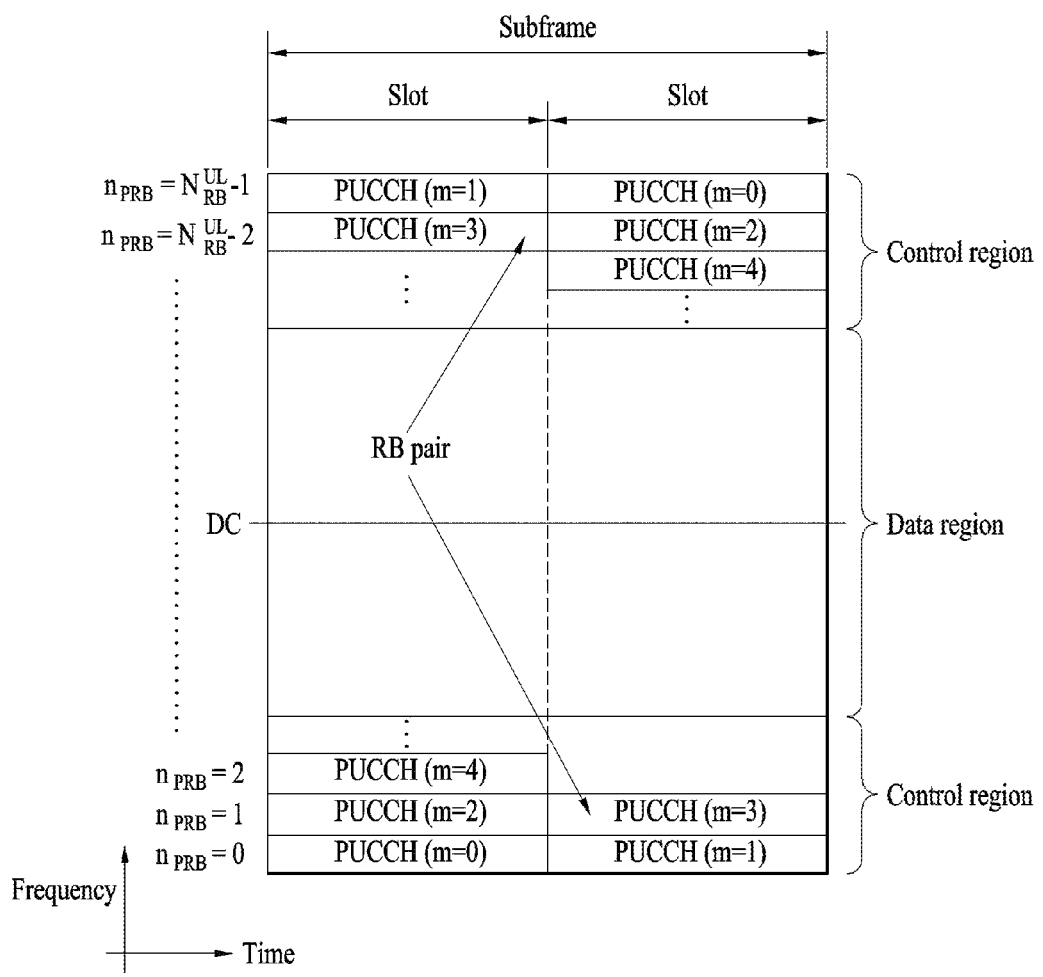
FIG. 4 is a diagram illustrating an example of a configuration of a UL subframe used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In the legacy LTE (Rel-8/9) and LTE-A (Rel-10/11) systems, only one DL/UL data may be scheduled from one DL/UL grant DCI, and a scheme (single-SF scheduling) is applied to transmit the DL/UL data through one DL/UL subframe. On the other hand, a future system may consider a "multi-subframe scheduling" scheme in which a plurality of DL/UL data are simultaneously scheduled from one DL/UL grant DCI to enhance spectrum efficiency, and have a configuration in which the plurality of DL/UL data are successively transmitted through a plurality of particular DL/UL subframes.

Meanwhile, in some cases, a subframe set may be configured for a purpose of further enhanced inter-cell interference coordination (FeICIC). The subframe set may refer to an agreed subframe for adjusting interference by a macro cell which affects a small cell in a heterogeneous communication environment using a scheme such as an almost blank subframe (ABS). Thus, a large interference difference may be generated in the subframe set, and a predictable change may occur in a transmission scheme including an MCS. Therefore, the multi-subframe scheduling may be designed based on the subframe set. The present invention proposes a control signaling configuration/transmission scheme for multi-subframe scheduling in an environment in which the subframe set is configured as described above.

Multi-Subframe Scheduling for Another Subframe Set

As mentioned above, a certain subframe set may be configured through cooperation between base stations and/or UEs such that a particular characteristic different from that of another subframe is maintained in the subframe set. For example, an interference environment may be intentionally adjusted in a particular subframe set as FeICIC or enhanced interference mitigation and traffic adaptation (eIMTA). In this instance, multi-subframe scheduling may be applied in each subframe set. A description below does not exclude a scheme of configuring and operating a new subframe set for multi-subframe scheduling in addition to an existing subframe set as FeICIC. In this case, the subframe set for multi-subframe scheduling may be configured using existing subframe set configuration signaling or separate signaling such as RRC signaling.

A multi-subframe scheduling window and multi-subframe DCI are defined for multi-subframe scheduling. The multi-subframe DCI may deliver control information for multi-subframe scheduling, and the multi-subframe scheduling window may include a subframe (or hereinafter a particular subframe) (referred to as a "start subframe") in which the multi-subframe DCI is detected or received, and K subsequent contiguous subframes (which may refer to K contiguous subframes having one subframe interval or H subframe intervals (H>1)). Therefore, multi-subframe scheduling applied to another subframe set may be independently configured in terms of the multi-subframe scheduling window and the multi-subframe DCI.

Multi-Subframe Scheduling Window for Another Subframe Set

A multi-subframe scheduling window may be configured according to a subframe set based on the following schemes.

In a first scheme, a multi-subframe scheduling window and multi-subframe DCI may be configured for each subframe set. The first scheme is a scheme of configuring existing multi-subframe scheduling for each subframe set. The configured multi-subframe scheduling window of each subframe set is valid only in each subframe set.

Figure 5:
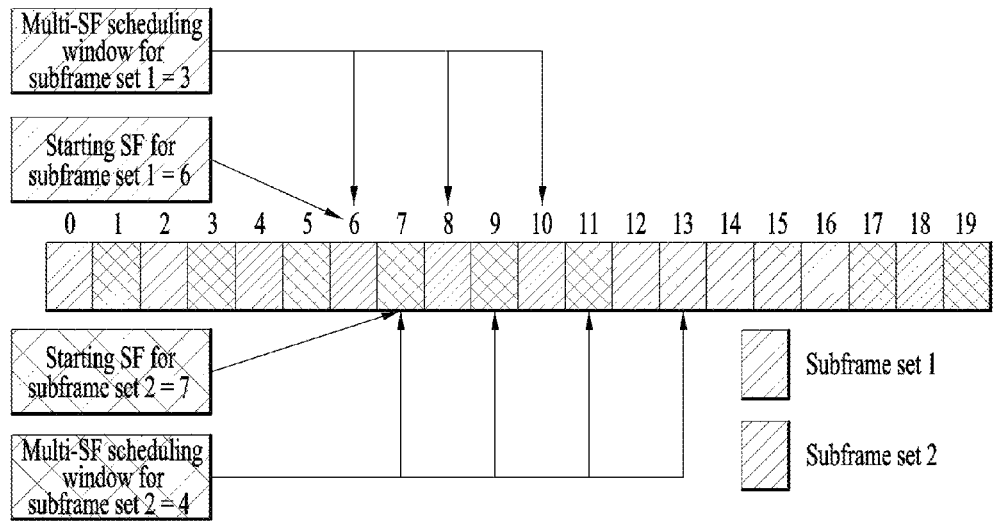
FIG. 5 is a diagram illustrating a multi-subframe scheduling window according to an embodiment of the present invention.

FIG. 5 illustrates that configurations of multi-subframe DCI and a multi-subframe scheduling window are allocated to each subframe set when two subframe sets 1 and 2 are configured. Hereinafter, a description will be given on the assumption that the multi-subframe DCI is transmitted or received in a starting SF.

Figure 6:
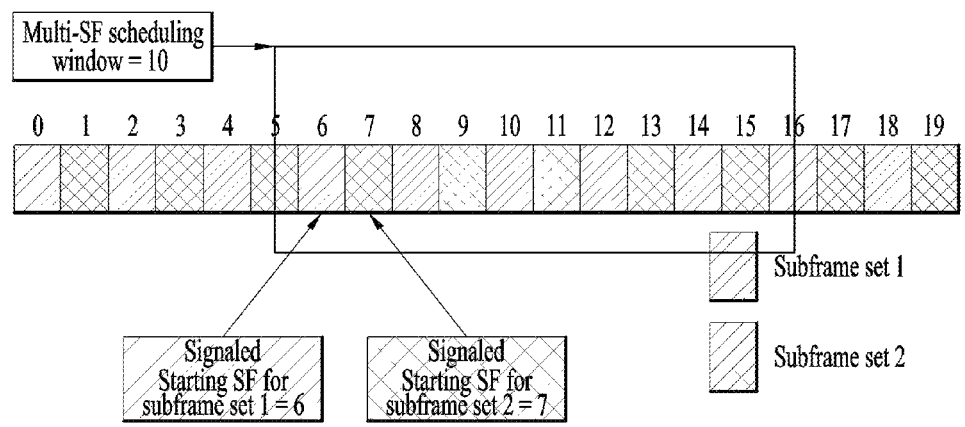
FIG. 6 is a diagram illustrating a multi-subframe scheduling window according to another embodiment of the present invention.

In a second scheme, a multi-subframe scheduling window may be defined in a whole subframe (or subframe set), and a starting SF may be separately defined for each subframe set. The multi-subframe scheduling window may be defined similarly to existing multi-subframe scheduling. Multi-subframe DCI is transmitted or received in a starting SF of each subframe set. FIG. 6 illustrates that, when two subframe sets 1 and 2 are configured, the multi-subframe scheduling window is configured to be common to the both subframe sets, and the starting SF is independently configured for each subframe set.

Figure 7:
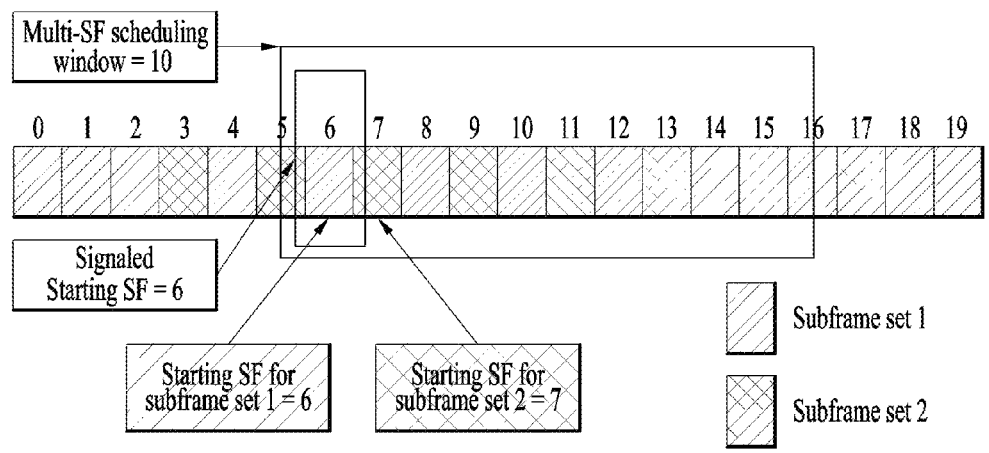
FIG. 7 is a diagram illustrating a multi-subframe scheduling window according to another embodiment of the present invention.

In a third scheme, a multi-subframe scheduling window and a start subframe may be defined in a whole subframe (or subframe set). In this case, a start subframe may be implicitly selected according to a given start subframe number in each subframe set. For example, when a start subframe number is set to n, subframe k corresponding to a smallest number among subframe numbers k (k≥n) belonging to a corresponding subframe set may be regarded as a start subframe for the corresponding subframe set. Referring to FIG. 7, a start subframe number is set to 6, and thus subframe 6 may be regarded as a start subframe in subframe set 1, and subframe 7 may be regarded as a start subframe in subframe set 2.

FIG. 7 illustrates an example of a circumstance in which, when two subframe sets are configured, a multi-subframe scheduling window and a start subframe are configured to be common to respective subframe sets.

Remaining subframes may not belong to any subframe set. In this case, independent single-subframe scheduling is used unless separate multi-subframe scheduling is performed for the remaining subframes. Therefore, in the above second and third schemes, even when the remaining subframes are included in a range of the multi-subframe scheduling window, if a separate multi-subframe scheduling configuration is not received, the subframes may not be affected by multi-subframe scheduling.

Figure 8:
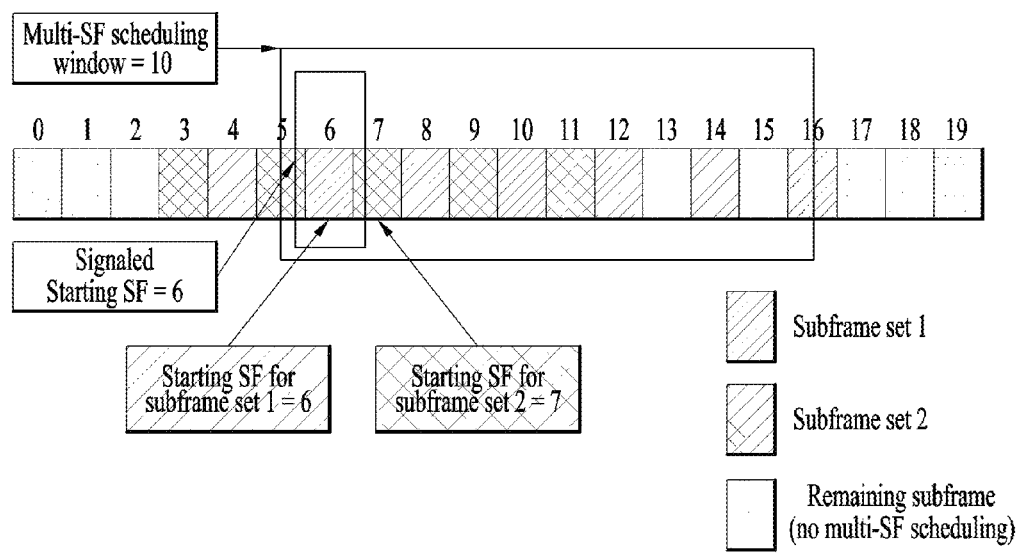
FIG. 8 is a diagram illustrating a multi-subframe scheduling window according to another embodiment of the present invention.

FIG. 8 illustrates a case in which the remaining subframes not receiving separate multi-subframe scheduling are included in the third scheme. Referring to FIG. 8, even though subframes 13 and 15 are included in the multi-subframe scheduling window, subframes 13 and 15 may not be affected by multi-subframe scheduling configured in the subframe set.

Figure 9:
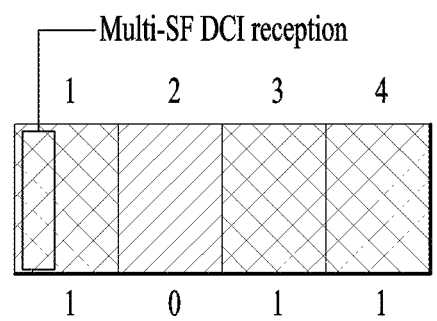
FIG. 9 is a diagram illustrating a configuration of a multi-subframe set according to an embodiment of the present invention.

A subframe set to which multi-subframe scheduling is applied may be directly reported through multi-subframe DCI. When a size of the multi-subframe scheduling window is defined as N subframes, a subframe to which the multi-subframe DCI is applied may be indicated by defining a bitmap having a size of N bits in the multi-subframe DCI. For example, when the multi-subframe scheduling window is defined as four subframes, a bit field of 4 bits may be defined in the multi-subframe DCI. When "1011" is transmitted in the bitmap field, if a subframe in which DCI is received is referred to as a first subframe, the multi-subframe DCI may be applied to first, third, and fourth subframes as in FIG. 9.

Figure 10:
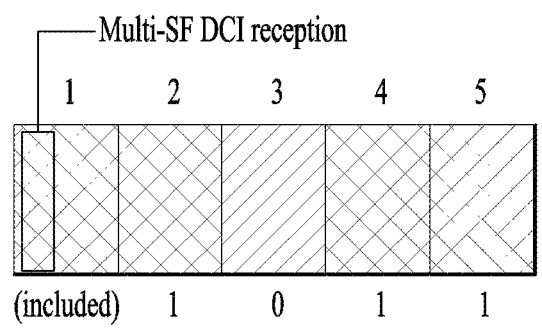
FIG. 10 is a diagram illustrating a configuration of a multi-subframe set according to another embodiment of the present invention.

Alternatively, when the multi-subframe DCI may be applied to a subframe in which the multi-subframe DCI is received, a subframe set of a maximum of N subframes may be designated by defining a bitmap having a size of (N−1)

bits. For example, when the multi-subframe scheduling window is defined as five subframes, a bit field of 4 bits may be defined in the multi-subframe DCI. When "1011" is transmitted in the bitmap field, if a subframe in which multi-subframe DCI is received/decoded is referred to as a first subframe, the multi-subframe DCI includes the first subframe to which the multi-subframe DCI is inevitably applied, and includes second, fourth, and fifth subframes corresponding to the bitmap "1011" transmitted from the second subframe. Finally, the multi-subframe DCI may be applied to the first, second, fourth, and fifth subframes as in FIG. 10.

A size of the multi-subframe scheduling window may be transmitted through the multi-subframe DCI. In this case, a bit field needs to be defined to transmit bits indicating the size of the multi-subframe scheduling window. For example, when a bit field of 2 bits is defined to transmit bits indicating the size of the multi-subframe scheduling window, 2 to 5 corresponding to the size of the multi-subframe scheduling window may be designated according to transmitted bit values of 00 to 11, respectively.

Alternatively, the size of the multi-subframe scheduling window may be determined in a predetermined table through signaling such as RRC signaling, etc. A table below shows an example of the size of the multi-subframe scheduling window.

TABLE 5

| window size indication bit | window size |
| --- | --- |
| 00 | 1 |
| 01 | 4 |
| 10 | 6 |
| 11 | 8 |

In other words, when "11" is transmitted as bits indicating the size of the multi-subframe scheduling window, the size of the multi-subframe scheduling window may be set to 8.

Two or more subframe set configurations may be configured using RRC, etc., and a configuration to be applied among the subframe set configurations may be designated by configuring a bit field in the multi-subframe DCI. For example, when a space having a size of 2 bits for subframe set configurations is given in the multi-subframe DCI, a total of four subframe set configurations may be configured as in the following Table.

TABLE 6

| bit | window size | subframe set |
| --- | --- | --- |
| 00 | 2 | all |
| 01 | 4 | all |
| 10 | 6 | all |
| 11 | 6 | 10101 |

In other words, when "11" is configured as a subframe set configuration, the multi-subframe scheduling has a multi-subframe scheduling window size of six subframes. When a subframe in which multi-subframe DCI is received is referred to as a first subframe, subframes 1, 2, 4, and 6 may be regarded as being affected by the multi-subframe DCI.

Alternatively, an offset value may be defined for an existing subframe set configuration and transmitted instead of the multi-subframe DCI.

TABLE 7

| bit | window size offset | subframe set |
| --- | --- | --- |
| 00 | 0 | same |
| 01 | +2 | add last 2 subframes |
| 10 | −2 | drop last 2 subframes |
| 11 | −4 | drop last 4 subframes |

In other words, when the multi-subframe scheduling window size corresponds to six subframes and a subframe set corresponds to "10101" in an existing subframe set configuration, if an offset index of "01" is received, the multi-subframe scheduling window size may become eight subframes, and the subframe set may become "1010101" by adding "01" corresponding to two last subframe parts.

Multi-Subframe DCI for Another Subframe Set

Multi-subframe DCI may be divided into full multi-subframe DCI and partial multi-subframe DCI according to type thereof.
  Full multi-subframe DCI: DCI including control information which is the same as or equivalent to that of existing multi-subframe DCI.
  Partial multi-subframe DCI: DCI simplified by including only partial control information of existing multi-subframe DCI. Excluded control information may be inherited from other multi-subframe DCI.

A. Full Multi-Subframe DCI

Full multi-subframe DCI may include content as below.
  Carrier indicator field (CIF): Carrier component information of the DCI
  Resource allocation (RA): Resource allocation information to be commonly applied in a multi-subframe scheduling window
  Channel state information-related control information (for example, TPC/MCS/TPMI): Channel information to be commonly applied in a multi-subframe scheduling window
  HARQ process number, redundancy version (RV), and new data indicator (NDI): Retransmission scheme-related information
  nSCID: The same value is applied to a whole multi-subframe scheduling window In the above content, retransmission schemes currently considered for the HARQ process number, the RV, and the NDI are as below.
  Scheme A-1: Retransmission using a single subframe as a unit. In this case, when subframes not subjected to multi-subframe scheduling are present among remaining subframes not configured as a subframe set separately from a multi-subframe scheduling window configured for data transmission, the subframes may be used for retransmission.
  Scheme A-2: Retransmission using a subframe group as a unit: Two or more subframes (smaller than a multi-subframe scheduling window size) are grouped into a subframe group and used as a unit of retransmission. In this case, a separate retransmission resource subjected to multi-subframe scheduling having the same size as that of the subframe group is needed for retransmission separately from a multi-subframe scheduling window configured for data transmission.
  Scheme A-3: A whole multi-subframe scheduling window subjected to multi-subframe scheduling may be used for retransmission. In this case, retransmission is performed in a multi-subframe scheduling window configured for data transmission.

HARQ Process Number

In retransmission scheme A-1, a HARQ process number needs to be allocated for each subframe. In this instance, when an existing field is used for transmission of the HARQ process number without change, a scheme as below is considered.

One value of the HARQ process number for a whole multi-subframe scheduling window is transmitted, and the HARQ process number is applied to the whole multi-subframe scheduling window. Even though one value of the HARQ process number for the whole multi-subframe scheduling window is transmitted, HARQ process numbers are successively applied to respective subframes in the multi-subframe scheduling window.

In other words, if a value signaled through a HARQ process number field is presumed to be P, K continuous HARQ process numbers including the value may be cyclically allocated using the following scheme. Here, it is presumed that maxHARQp may refer to a maximum number of HARQ processes (supportable by a UE), the number of HARQ process reception buffers, or the number of HARQ processes designated for multi-subframe scheduling, and a HARQ process number according to maxHARQp may have a value within a range of 0 to (maxHARQp−1).

HARQ process number allocated to a first subframe (data): (P) mod maxHARQp

HARQ process number allocated to a second subframe (data): (P+1) mod maxHARQp

...

HARQ process number allocated to a Kth subframe (data): (P+K−1) mod maxHARQp

When a combination of two or more existing fields or a new field is used for transmission of a HARQ process number, a scheme of reporting K HARQ process numbers using a combinatorial index is considered as below. Here, it is presumed that a HARQ process number may have a value within a range of 1 to maxHARQp.

K selected HARQp numbers using a combinatorial index r defined as Error! Objects cannot be created from editing field codes. where the set Error! Objects cannot be created from editing field codes. (Error! Objects cannot be created from editing field codes.) contains the K sorted HARQp numbers and Error! Objects cannot be created from editing field codes. is the extended binomial coefficient, resulting in unique label Error! Objects cannot be created from editing field codes.

When the combination of existing fields is used for transmission of a HARQ process number, schemes below are considered as field combination schemes.

1) HARQ Process Number+RV Field

This scheme may be applied to TM-common DCI (for example, DCI format 1A) for scheduling only a maximum of one transport block (TB) per subframe. Specifically, while an RV pattern for initial transmission and retransmission of data subjected to multi-subframe scheduling is configured in advance (through RRC signaling, etc.), it is possible to allocate a HARQ process number for data subjected to multi-subframe scheduling by combining a HARQ process number field and an RV field in a corresponding DCI format.

2) HARQ Process Number+MCS and/or RV Field

This scheme may be applied to a TM-dedicated DCI (for example, DCI format 2C/2D) for scheduling a maximum of two TBs per subframe. Specifically, (when HARQ process number/MCS/RV field corresponding to TB1 and TB2 in the DCI format are referred to as HARQ1/MCS1/RV1 and HARQ2/MCS2/RV2, respectively), it is possible to allocate a HARQ process number for a plurality of TBs subjected to multi-subframe scheduling by commonly applying an MCS and/or an RV value signaled through MCS1 and/or an RV1 field equally to a plurality of TBs subjected to multi-subframe scheduling and combining a HARQ1/HARQ2 field with MCS2 and/or an RV2 field.

In retransmission scheme A-2, an operation is similarly performed to that of the first retransmission scheme. However, each value is allocated in subframe groups.

Alternatively, even though HARQ process numbers are numbered in subframes, acknowledgement/negative-acknowledgement (A/N) may be transmitted by merging information in subframe groups using a scheme such as logical product, etc. of A/N values of a subframe.

In retransmission scheme A-3, a scheme may be used to transmit one value of a HARQ process number for a whole multi-subframe scheduling window and apply the HARQ process number to the whole multi-subframe scheduling window.

Alternatively, while HARQ process numbering is performed in subframes or subframe groups, A/N may be transmitted in multi-subframe scheduling windows using a scheme such as logical product, etc. of A/N values of a subframe or a subframe group. In this case, referring to HARQ process numbers, HARQ process numbering may be used in subframes as in retransmission scheme A-1 or in subframe groups as in retransmission scheme A-2.

Redundancy Version (RV)

An RV may have a different type according to retransmission scheme.

In retransmission scheme A-1, retransmission is performed based on scheduling using a single subframe as a unit, and thus may be performed through single subframe scheduling. In this case, an RV may be included in DCI of the single subframe for retransmission, and multi-subframe DCI may not include an RV.

In retransmission scheme A-2, a unit of transmitted A/N may correspond to a subframe group including two or more preconfigured subframes among multi-subframe scheduled subframes. In this case, separate multi-subframe scheduling for retransmission may be performed. In this case, an RV may be included in multi-subframe DCI of a multi-subframe scheduling resource for retransmission. In other words, multi-subframe DCI for initial transmission may not include an RV.

In retransmission scheme A-3, data transmission and retransmission is performed in each multi-subframe scheduling window, and thus multi-subframe DCI may include an RV. When one or more retransmissions are performed in the multi-subframe scheduling window, multi-subframe DCI needs to include all RVs for respective retransmissions.

To specify a subframe in which retransmission is performed, a number of a subframe in which retransmission is started or a length of a subframe used for retransmission may be transmitted together with the RV.

New Data Indicator (NDI)

In retransmission schemes A-1 and A-2, a separate resource for data retransmission is managed, and thus all data subjected to multi-subframe scheduling corresponds to new data. In other words, an NDI may not be included in corresponding multi-subframe DCI.

In retransmission scheme A-3, data transmission and retransmission are performed in each multi-subframe scheduling window, and thus multi-subframe DCI may include an NDI. In this instance, information about a subframe in which retransmission is separated from new data (initial transmission) is needed.

Scheme A-3-1: An NDI may include information about a subframe in which new data is started.

The new data start subframe information may be included as a relative position of a subframe in which multi-subframe DCI is received. For example, when the multi-subframe DCI is detected from a Kth subframe, and new data starts to be transmitted in a (K+P)th subframe (P<min(multi-subframe scheduling window size, maxHARQp)), P may be included in the NDI.

Scheme A-3-2: An RV may include information about a subframe in which new data is started.

Scheme A-3-3: A new field may be created in multi-subframe DCI, thereby transmitting information related to a subframe in which retransmission and transmission of new data are performed.

In the above Schemes A-3-1, A-3-2 and A-3-3, the new data transmission start subframe information may be replaced by retransmission subframe length information.

B. Partial Multi-Subframe DCI

Partial multi-subframe DCI is a simplified version of the above-described full multi-subframe DCI. In the partial multi-subframe DCI, a resource allocation field part may be omitted by sharing the same resource allocation configuration in two or more subframe sets. In addition, according to retransmission scheme, an RV may be omitted from the multi-subframe DCI. When retransmission is performed in each subframe, transmission may be performed using single-subframe scheduling. Therefore, the RV may not be included in the partial multi-subframe DCI.

The multi-subframe DCI may be configured according to subframe set based on the following schemes.

Scheme B-1: All subframe sets correspond to the full multi-subframe DCI. The full multi-subframe DCI is configured for each start subframe of each subframe set.

Scheme B-2: At least one full multi-subframe DCI+a plurality of partial multi-subframe DCI. The full multi-subframe DCI is transmitted in a start subframe of at least one subframe set, and the partial multi-subframe DCI is transmitted in a start subframe of another subframe set except for the subframe set. In this case, a subframe set linked to the full multi-subframe DCI and a subframe set linked to the partial multi-subframe DCI may be signaled using a scheme such as RRC signaling, and corresponding information may include information about full/partial multi-subframe DCI from which other control information omitted from the partial multi-subframe DCI is to be inherited.

For example, when two subframe sets are present and multi-subframe scheduling is performed in each of the subframe sets, two multi-subframe DCI may share resource allocation information, and other control information (for example, HARQ, NDI, RV, etc.) may be independently used. In other words, partial multi-subframe DCI may include all other control information except for resource allocation information, and the resource allocation information may correspond to a value of main (full) multi-subframe DCI.

In addition, some information of the partial multi-subframe DCI may correspond to information subjected to information about the main (full) multi-subframe DCI rather than independent information. For example, in the MCS, an offset for a value of the main (full) multi-subframe DCI may be transmitted using the multi-subframe DCI. In this case, a size of a field for transmitting dependent information such as the MCS may be decreased when compared to a size of an existing field.

Scheme B-3: Cross-subframe set multi-subframe scheduling. DCI of one subframe set may include multi-subframe DCI of another subframe set. DCI of a particular subframe set including multi-subframe DCI of another subframe set is referred to as cross-subframe set multi-subframe DCI. The cross-subframe set multi-subframe DCI may indicate a subframe set, information about which is included in the DCI, using a field previously including two or more multi-subframe DCI (for example, a CIF field, etc.). For example, CIF=5 may be defined to indicate a second subframe set such that the multi-subframe DCI may be regarded as DCI about the second subframe set. Alternatively, a field indicating a new subframe set may be defined to explicitly indicate a subframe set indicated by each multi-subframe DCI.

Scheme B-4: New DCI format. One multi-subframe DCI may include all control information about two or more subframe sets, and the multi-subframe DCI may be transmitted in one of the subframe sets. The new DCI format may be created by merging one full multi-subframe DCI with one or more partial multi-subframe DCI.

Figure 11:
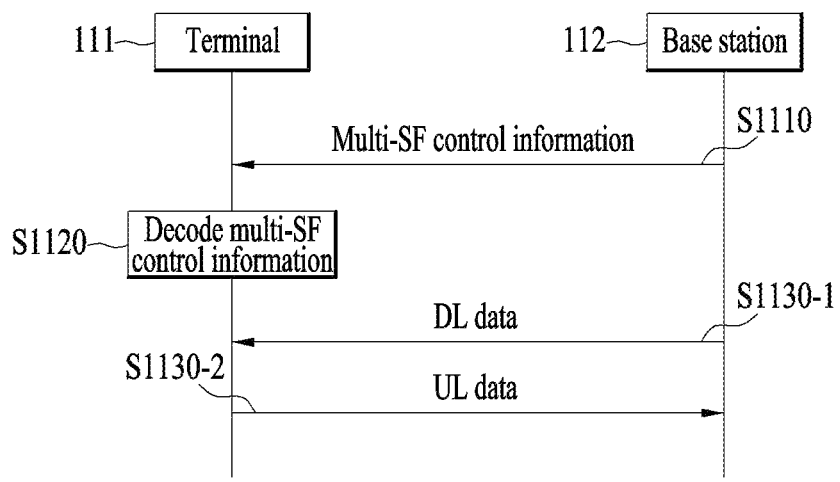
FIG. 11 is a diagram illustrating an operation according to an embodiment of the present invention.

FIG. 11 illustrates an operation according to an embodiment of the present invention.

FIG. 11 is related to a method for multi-subframe scheduling in a scheduling window of a plurality of subframe sets (hereinafter, multiple subframes (multi-subframe)) according to an embodiment of the present invention.

In S1110, a terminal 111 may receive multi-subframe control information for multi-subframe scheduling from a base station 112. In S1120, the terminal 111 may decode the received multi-subframe control information. In S1130, the terminal 111 may receive downlink data or transmit uplink data according to the decoded control information.

In addition, the multi-subframe control information includes a field for retransmission related to each of multiple subframes, and the retransmission may be performed in a subframe which is not configured as the multiple subframes.

In addition, the multi-subframe control information includes a multi-subframe scheduling HARQ process number field allocated to the multi-subframe scheduling window, and a HARQ process number of each of the multiple subframes may be acquired from a value of the multi-subframe scheduling HARQ process number field.

In addition, the multi-subframe control information includes a multi-subframe scheduling HARQ process number field allocated to the multi-subframe scheduling window, and a HARQ process number of each of the multiple subframes may be acquired from a combination of a value of the multi-subframe scheduling HARQ process number field, and a value of an MCS field and/or an RV field.

In addition, the multi-subframe control information may include full multi-subframe control information for one subframe set in the multiple subframes and partial multi-subframe control information for remaining subframe sets in the multiple subframes. In addition, the terminal 111 may receive information about the one subframe set and the remaining subframe sets.

In addition, control information excluded from the partial multi-subframe control information may be acquired from particular control information of the full multi-subframe control information.

In addition, the partial multi-subframe control information may include an offset value for a particular field of the full multi-subframe control information.

In addition, the multi-subframe control information may include information about a size of the multi-subframe scheduling window and each subframe set configuration of the multiple subframes.

Figure 12:
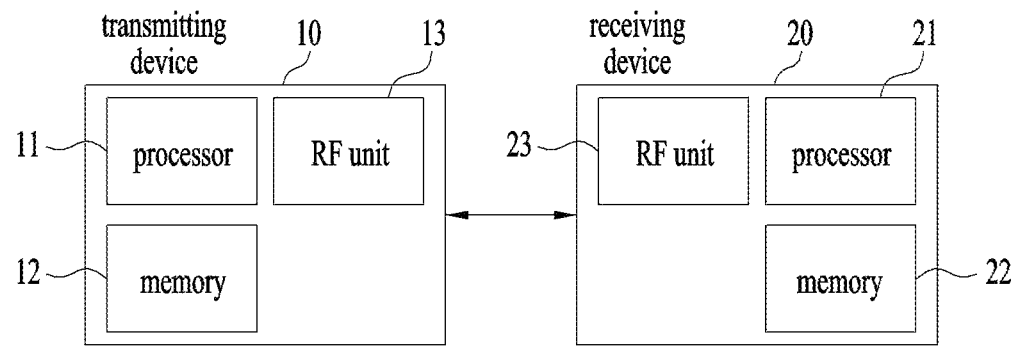
FIG. 12 is a block diagram of an apparatus for implementing embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

According an embodiment of the present invention, accuracy of position estimation can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing, by a terminal, multiple subframe (multi-subframe) scheduling by scheduling multi-subframe sets in a multi-subframe scheduling window, the method comprising:

receiving multi-subframe control information indicating downlink control information for the multi-subframe sets in a respective starting subframe of the multi-subframe sets in the multi-subframe scheduling window, each of the multi-subframe sets including a plurality of subframes; and receiving downlink data or retransmitted downlink data, or transmitting uplink data using the multi-subframe control information, wherein the multi-subframe control information includes a field for retransmission related to each subframe of the multi-subframe sets, and the retransmitted downlink data is received in subframes not configured as the multi-subframe sets among subframes included in the multi-subframe scheduling window, wherein the multi-subframe control information includes full multi-subframe control information for one subframe set of the multiple subframe sets and partial multi-subframe control information for remaining subframe sets of the multiple subframe sets.

2. The method according to claim 1, wherein the multi-subframe control information includes a multi-subframe scheduling hybrid automatic repeat request (HARQ) process number field allocated to the multi-subframe scheduling window, and wherein a HARQ process number for each subframe of the multi-subframe sets is acquired from a value in the multi-subframe scheduling HARQ process number field.

3. The method according to claim 2, wherein the HARQ process number of each subframe of the multi-subframe sets is acquired from a combination of the value in the multi-subframe scheduling HARQ process number field, and a value in a modulation and coding scheme (MCS) field or a redundancy version (RV) field.

4. The method according to claim 1, wherein remaining control information not included in the partial multi-subframe control information is acquired from particular control information in the full multi-subframe control information.

5. The method according to claim 1, wherein the partial multi-subframe control information includes an offset value for a particular field in the full multi-subframe control information.

6. The method according to claim 1, further comprising: receiving information about the one subframe set and the remaining subframe sets.

7. The method according to claim 1, wherein the multi-subframe control information includes information about a size of the multi-subframe scheduling window and each subframe set configuration of the multi-subframe sets.

8. A terminal for performing multiple subframe (multi-subframe) scheduling by scheduling multi-subframe sets in a scheduling window, the terminal comprising:

a radio frequency (RF) unit that transmits and receives radio signals; and a processor that controls the RF unit to:

receive multi-subframe control information indicating downlink control information for the multi-subframe sets in a respective starting subframe of the multi-subframe sets in the multi-subframe scheduling window, each of the multi-subframe sets including a plurality of subframes, and receive downlink data or retransmitted downlink data, or transmit uplink data using the multi-subframe control information, wherein the multi-subframe control information includes a field for retransmission related to each subframe of the multi-subframe sets, and the retransmitted downlink data is received in subframes not configured as the multi-subframe sets among subframes included in the multi-subframe scheduling window, wherein the multi-subframe control information includes full multi-subframe control information for one subframe set of the multiple subframe sets and partial multi-subframe control information for remaining subframe sets of the multiple subframe sets.

9. The terminal according to claim 8, wherein the multi-subframe control information includes a multi-subframe scheduling HARQ process number field allocated to the multi-subframe scheduling window, and wherein a HARQ process number for each subframe of the multi-subframe sets is acquired from a value in the multi-subframe scheduling HARQ process number field.

10. The terminal according to claim 9, wherein the HARQ process number of each subframe of the multi-subframe sets is acquired from a combination of the value in the multi-subframe scheduling HARQ process number field, and a value in a modulation and coding scheme (MCS) field or a redundancy version (RV) field.

11. The terminal according to claim 8, wherein remaining control information not included in the partial multi-subframe control information is acquired from particular control information in the full multi-subframe control information.

12. The terminal according to claim 8, wherein the partial multi-subframe control information includes an offset value for a particular field in the full multi-subframe control information.

13. The terminal according to claim 8, wherein the processor further controls the RF unit to receive information about the one subframe set and the remaining subframe sets.

14. The terminal according to claim 8, wherein the multi-subframe control information includes information about a size of the multi-subframe scheduling window and each subframe set configuration of the multi-subframe sets.

* * * * *